(12) United States Patent
Wang et al.

(10) Patent No.: US 10,057,820 B2
(45) Date of Patent: Aug. 21, 2018

(54) CONTROL CHANNEL TRANSMISSION METHOD AND EQUIPMENT

(71) Applicant: Huawei Device Co., Ltd., Shenzhen (CN)

(72) Inventors: Jian Wang, Beijing (CN); Kai Xu, Beijing (CN); Qiang Wu, Beijing (CN)

(73) Assignee: HUAWEI DEVICE (SHENZHEN) CO., LTD., Shenzhen (CN)

( * ) Notice: Subject to any disclaimer, the term of this patent is extended or adjusted under 35 U.S.C. 154(b) by 203 days.

(21) Appl. No.: 14/949,461

(22) Filed: Nov. 23, 2015

(65) Prior Publication Data
US 2016/0080987 A1    Mar. 17, 2016

Related U.S. Application Data

(63) Continuation of application No. 14/494,831, filed on Sep. 24, 2014, now Pat. No. 9,215,632, which is a
(Continued)

(30) Foreign Application Priority Data

Sep. 26, 2012 (CN) .......................... 2012 1 0364878

(51) Int. Cl.
*H04W 72/04* (2009.01)
*H04W 36/00* (2009.01)
(Continued)

(52) U.S. Cl.
CPC ... *H04W 36/0061* (2013.01); *H04W 36/0072* (2013.01); *H04W 72/0406* (2013.01);
(Continued)

(58) Field of Classification Search
CPC . H04W 72/0406; H04W 28/18; H04W 72/00; H04W 72/04666; H04L 5/0053; H04L 5/00; H04L 5/005
See application file for complete search history.

(56) References Cited

U.S. PATENT DOCUMENTS 7,940,795 B2 * 5/2011 Frederiksen .......... H04W 28/18
370/242
8,606,286 B2   12/2013 Vrzic et al.
(Continued)

FOREIGN PATENT DOCUMENTS

AU    2007206548 B2    7/2007
CN    101563901 A    10/2009
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0, Technical Specification, Jun. 2012, 102 pages.
(Continued)

*Primary Examiner* — Raj Jain
(74) *Attorney, Agent, or Firm* — Conley Rose, P.C.

(57) ABSTRACT

A control channel transmission method and a piece of equipment, where the method includes configuring, by a communications system, at least two control channels for a user equipment, where at least one of the control channels is a cell-specific control channel and at least one of the control channels is a user equipment-specific control channel; using, by the communications system, the cell-specific control channel and/or user equipment-specific control channel to send information about control over the user equipment. In the embodiments of the present disclosure, a communications system configures at least two control channels for a user equipment (UE). The communications system may use, in a process of reconfiguring a control channel, another control channel to send information about control over the UE to ensure that communication is not interrupted during cell handover of the UE.

6 Claims, 8 Drawing Sheets

Related U.S. Application Data continuation of application No. PCT/CN2013/084065, filed on Sep. 24, 2013.

(51) Int. Cl.
*H04W 88/02* (2009.01)
*H04W 88/08* (2009.01)

(52) U.S. Cl.
CPC ........ *H04W 72/0413* (2013.01); *H04W 88/02* (2013.01); *H04W 88/08* (2013.01)

(56) References Cited

U.S. PATENT DOCUMENTS

| | | | |
|---|---|---|---|
| 9,131,410 B2 * | 9/2015 | Gupta | H04W 36/0011 |
| 9,609,642 B2 * | 3/2017 | Xia | H04W 72/042 |
| 2008/0137524 A1 | 6/2008 | Anderson et al. | |
| 2011/0211538 A1 | 9/2011 | Kakura | |
| 2012/0322483 A1 * | 12/2012 | Ji | H04L 5/00 455/509 |
| 2013/0155990 A1 | 6/2013 | Nishio et al. | |
| 2013/0301543 A1 * | 11/2013 | Eriksson | H04W 72/00 370/329 |
| 2013/0343342 A1 | 12/2013 | Yu et al. | |
| 2014/0003349 A1 | 1/2014 | Kang et al. | |
| 2014/0029580 A1 * | 1/2014 | Jung | H04W 36/08 370/331 |
| 2014/0050190 A1 | 2/2014 | Shimezawa et al. | |
| 2014/0161056 A1 * | 6/2014 | Moulsley | H04W 72/042 370/329 |
| 2015/0011223 A1 * | 1/2015 | Wang | H04W 36/0061 455/437 |
| 2015/0181568 A1 | 6/2015 | Seo et al. | |
| 2015/0245322 A1 | 8/2015 | Shimezawa et al. | |

FOREIGN PATENT DOCUMENTS

| | | |
|---|---|---|
| CN | 101779508 A | 7/2010 |
| EP | 2613599 A1 | 7/2013 |
| JP | 2014508471 A | 4/2014 |
| WO | 2010085910 A1 | 8/2010 |
| WO | 2012029245 A1 | 3/2012 |
| WO | 2012109542 A1 | 8/2012 |
| WO | 2012118269 A2 | 9/2012 |

OTHER PUBLICATIONS

Foreign Communication From a Counterpart Application, European Application No. 13841991.6, European Office Action dated Jun. 6, 2016, 9 pages.

Partial English Translation and Abstract of Japanese Patent Application No. JP2014508471, dated Apr. 3, 2014, 162 pages.

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.0.0, Technical Specification, Sep. 2012, 106 pages.

"3rd Generation Partnership Project; Technical Specification Group Radio Access Network; Evolved Universal Terrestrial Radio Access (E-UTRA); Physical layer procedures (Release 11)," 3GPP TS 36.213, V11.0.0, Technical Specification, Sep. 18, 2012, 143 pages.

"DCI content to support CoMP," 3GPP TSG RAN1 #68, R1-120323, Feb. 6-10, 2012, 3 pages.

"Enhancements of DL DMRS for CoMP," 3GPP TSG RAN WG1 Meeting #67, R1-113641, Nov. 14-18, 2011, 4 pages.

"Design Consideration for E-PDCCH," 3GPP TSG RAN WG1 Meeting #66 bis, R1-113236, Oct. 10-14, 2011, 6 pages.

Notice of Allowance dated Oct. 1, 2015, 8 pages, U.S. Appl. No. 14/494,831, filed Sep. 24, 2014.

Foreign Communication From a Counterpart Application, European Application No. 13841991.6, Extended European Search Report dated Feb. 19, 2015, 10 pages.

Foreign Communication From a Counterpart Application, Chinese Application No. 201210364878.4, Chinese Office Action dated Mar. 2, 2016, 11 pages.

Foreign Communication From a Counterpart Application, Japanese Application No. 2015-532296, Japanese Office Action dated Mar. 1, 2016, 3 pages.

Foreign Communication From a Counterpart Application, Chinese Application No. 2015-532296, English Translation of Chinese Office Action dated Mar. 1, 2016, 4 pages.

Foreign Communication From a Counterpart Application, PCT Application No. PCT/CN2013/084065, English Translation of International Search Report dated Jan. 2, 2014, 2 pages.

Foreign Communication From a Counterpart Application, PCT Application No. PCT/CN2013/084065, English Translation of Written Opinion dated Jan. 2, 2014, 9 pages.

Samsung, "Support of Common Search Space for E-PDCCHs," XP050599907, 3GPP TSG RAN WG1 #68bis, R1-121644, Mar. 26-30, 2012, 2 pages.

Panasonic, ""Fallback" operation for ePDCCH transmission," XP050600468, 3GPP TSG RAN WG1 Meeting #69, R1-122204, May 21-25, 2012, 2 pages.

Foreign Communication From a Counterpart Application, European Application No. 13841991.6, European Office Action dated Jul. 5, 2017, 13 pages.

Ericsson, et al., "ePDCCH fallback," XP050600296, R1-122004, 3GPP TSG-RAN WG1 #69, May 21-25, 2012, 2 pages.

Foreign Communication From a Counterpart Application, European Application No. 13841991.6, European Search Report dated Feb. 7, 2018, 7 pages.

\* cited by examiner

CONTROL CHANNEL TRANSMISSION METHOD AND EQUIPMENT

CROSS-REFERENCE TO RELATED APPLICATIONS

This application is a continuation of U.S. patent application Ser. No. 14/494,831, filed on Sep. 24, 2014, which is a continuation of International Application No. PCT/CN2013/084065, filed on Sep. 24, 2013, which claims priority to Chinese Patent Application No. 201210364878.4, filed on Sep. 26, 2012, all of which are hereby incorporated by reference in their entireties.

TECHNICAL FIELD

The present disclosure relates to the field of communications technologies, and in particular, to a control channel transmission method and a piece of equipment.

BACKGROUND

In a 3rd Generation Partnership Project (3G) Long Term Evolution (LTE) system, a user equipment (UE) may be served by multiple cells. A first serving cell and a second serving cell are used as an example. An enhanced physical downlink control channel (ePDCCH) configured when the UE is served by the first serving cell is different from an ePDCCH configured when the UE is served by the second serving cell.

According to the prior art, when the UE hands over from the first serving cell to the second serving cell, the first serving cell sends radio resource control (RRC) reconfiguration signaling to the UE to instruct the UE to reconfigure the ePDCCH. After reconfiguring the ePDCCH, the UE sends back RRC reconfiguration completion signaling to the first serving cell.

In a process of implementing this embodiment, the inventor finds that, within a period from a time when a base station sends RRC reconfiguration signaling to a time when the base station receives RRC reconfiguration completion signaling sent back by the UE, data communication interruption may occur because control signaling of the base station is not detected by the UE.

SUMMARY

The embodiments of the present disclosure provide a control channel transmission method and a piece of equipment, so as to resolve a communication interruption problem during cell handover of a UE.

According to a first aspect, an embodiment of the present disclosure provides a control channel transmission method, including configuring, by a communications system, at least two control channels for a user equipment, where at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels; using, by the communications system, the cell-specific control channel and/or the user equipment-specific control channel to send information about control over the user equipment.

With reference to the first aspect, the using, by the communications system, the cell-specific control channel to send information about control over the user equipment includes using, by the communications system, a cell-specific scrambling code to perform scrambling on the information about control; using, by the communications system, the cell-specific control channel or user equipment-specific control channel to send a scrambled information about control.

Generation parameters of the cell-specific scrambling code include a cell-specific identity.

The using, by the communications system, the user equipment-specific control channel to send information about control over the user equipment includes using, by the communications system, a user equipment-specific scrambling code to perform scrambling on the information about control; using, by the communications system, the user equipment-specific control channel or cell-specific control channel to send a scrambled information about control.

Generation parameters of the user equipment-specific scrambling code include a user equipment-specific identity.

Configuration parameters of the cell-specific control channel include the cell-specific identity.

Configuration parameters of the user equipment-specific control channel include the user equipment-specific identity.

The configuring, by a communications system, at least two control channels for a user equipment includes configuring, by the communications system, at least one first user equipment-specific control channel and at least one first cell-specific control channel for the user equipment in a first cell; and configuring, by the communications system, at least one second user equipment-specific control channel and at least one second cell-specific control channel for the user equipment in a second cell.

A cell-specific identity of the first cell is the same as a cell-specific identity of the second cell, and the first cell-specific control channel is the same as the second cell-specific control channel.

After the configuring, by a communications system, at least two control channels for a user equipment, the method further includes sending, by the communications system, a first RRC reconfiguration instruction to the user equipment, where the first RRC reconfiguration instruction is used to instruct the user equipment to reconfigure the first user equipment-specific control channel as the second user equipment-specific control channel; the using, by the communications system, the cell-specific control channel and/or the user equipment-specific control channel to send information about control over the user equipment includes using, by the communications system, the first cell-specific control channel to send the information about control.

A cell-specific identity of the first cell is different from a cell-specific identity of the second cell, and the first cell-specific control channel is different from the second cell-specific control channel.

After the configuring, by a communications system, at least two control channels for a user equipment, the method further includes sending, by the communications system, a second RRC reconfiguration instruction to the user equipment, where the second RRC reconfiguration instruction is used to instruct the user equipment to reconfigure the first cell-specific control channel as the second cell-specific control channel; the using, by the communications system, the cell-specific control channel and/or the user equipment-specific control channel to send information about control over the user equipment includes using, by the communications system, the first user equipment-specific control channel to send the information about control.

According to a second aspect, an embodiment of the present disclosure provides a control channel transmission method, including detecting, by a user equipment on a cell-specific control channel and/or a user equipment-specific control channel assigned by a communications system, information about control of the communications system over the user equipment, where the communications system configures at least two control channels for the user equipment, at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels.

With reference to the second aspect, the detecting, by a user equipment on a cell-specific control channel assigned by a communications system, information about control of the communications system over the user equipment includes using, by the user equipment, a cell-specific scrambling code to perform descrambling on the information about control.

Generation parameters of the cell-specific scrambling code include a cell-specific identity.

The detecting, by a user equipment and on a user equipment-specific control channel assigned by a communications system, information about control of the communications system over the user equipment includes using, by the user equipment, a user equipment-specific scrambling code to perform descrambling on the information about control.

Generation parameters of the user equipment-specific scrambling code include a user equipment-specific identity.

Configuration parameters of the cell-specific control channel include the cell-specific identity.

Configuration parameters of the user equipment-specific control channel include the user equipment-specific identity.

The communications system configures at least one first user equipment-specific control channel and at least one first cell-specific control channel for the user equipment in a first cell; and the communications system configures at least one second user equipment-specific control channel and at least one second cell-specific control channel for the user equipment in a second cell.

A cell-specific identity of the first cell is the same as a cell-specific identity of the second cell, and the first cell-specific control channel is the same as the second cell-specific control channel.

The detecting, by a user equipment and on a cell-specific control channel and/or a user equipment-specific control channel assigned by a communications system, information about control of the communications system over the user equipment, further includes receiving, by the user equipment, a first RRC reconfiguration instruction sent by the communications system, where the first RRC reconfiguration instruction is used to instruct the user equipment to reconfigure the first user equipment-specific control channel as the second user equipment-specific control channel; the detecting, by a user equipment and on a cell-specific control channel and/or a user equipment-specific control channel assigned by a communications system, information about control of the communications system over the user equipment includes detecting, by the user equipment and on the first cell-specific control channel, the information about control sent by the communications system.

A cell-specific identity of the first cell is the same as a cell-specific identity of the second cell, and the first cell-specific control channel is the same as the second cell-specific control channel.

The detecting, by a user equipment and on a cell-specific control channel or a user equipment-specific control channel assigned by a communications system, information about control of the communications system over the user equipment, further includes receiving, by the user equipment, a second RRC reconfiguration instruction sent by the communications system, where the second RRC reconfiguration instruction is used to instruct the user equipment to reconfigure the first cell-specific control channel as the second cell-specific control channel; the detecting, by a user equipment and on a cell-specific control channel and/or a user equipment-specific control channel assigned by a communications system, information about control of the communications system over the user equipment includes detecting, by the user equipment and on the first user equipment-specific control channel, the information about control sent by the communications system.

According to a third aspect, the present disclosure provides a communications system, including a communications network side equipment, where the communications network side equipment includes a configuration module configured to configure at least two control channels for a user equipment, where at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels; a sending module configured to use the cell-specific control channel and/or the user equipment-specific control channel to send information about control over the user equipment.

With reference to a third aspect, the communications network side equipment further includes a first scrambling module configured to use a cell-specific scrambling code to perform scrambling on the information about control.

The sending module is configured to use the cell-specific control channel or user equipment-specific control channel to send scrambled information about control.

In the first scrambling module, generation parameters of the cell-specific scrambling code include a cell-specific identity. A second scrambling module configured to use a user equipment-specific scrambling code to perform scrambling on the information about control.

The sending module is configured to use the user equipment-specific control channel or cell-specific control channel to send scrambled information about control.

In the second scrambling module, generation parameters of the user equipment-specific scrambling code include a user equipment-specific identity.

The configuration module is configured to include the cell-specific identity in configuration parameters of the cell-specific control channel.

The configuration module is configured to include the user equipment-specific identity in configuration parameters of the user equipment-specific control channel.

The configuration module is configured to configure at least one first user equipment-specific control channel and at least one first cell-specific control channel for the user equipment in a first cell, and configure at least one second user equipment-specific control channel and at least one second cell-specific control channel for the user equipment in a second cell.

In the configuration module, a cell-specific identity of the first cell is the same as a cell-specific identity of the second cell, and the first cell-specific control channel is the same as the second cell-specific control channel.

The sending module is further configured to send a first RRC reconfiguration instruction to the user equipment, where the first RRC reconfiguration instruction is used to instruct the user equipment to reconfigure the first user equipment-specific control channel as the second user equipment-specific control channel, and use the first cell-specific control channel to send the information about control.

In the configuration module, a cell-specific identity of the first cell is different from a cell-specific identity of the second cell, and the first cell-specific control channel is different from the second cell-specific control channel.

The sending module is further configured to send a second RRC reconfiguration instruction to the user equipment, where the second RRC reconfiguration instruction is used to instruct the user equipment to reconfigure the first cell-specific control channel as the second cell-specific control channel, and use the first user equipment-specific control channel to send the information about control.

According to a fourth aspect, the present disclosure provides a user equipment, including a detecting module configured to detect, on a cell-specific control channel and/or user equipment-specific control channel assigned by a communications system, information about control of the communications system over the user equipment, where the communications system configures at least two control channels for the user equipment, at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels.

With reference to the fourth aspect, the user equipment further includes a first descrambling module configured to use a cell-specific scrambling code to perform descrambling on the information about control.

In the first descrambling module, generation parameters of the cell-specific scrambling code include a cell-specific identity. A second descrambling module configured to use a user equipment-specific scrambling code to perform descrambling on the information about control.

In the second descrambling module, generation parameters of the user equipment-specific scrambling code include a user equipment-specific identity.

Configuration parameters of the cell-specific control channel include the cell-specific identity.

Configuration parameters of the user equipment-specific control channel include the user equipment-specific identity.

The communications system configures at least one first user equipment-specific control channel and at least one first cell-specific control channel for the user equipment in a first cell; and the communications system configures at least one second user equipment-specific control channel and at least one second cell-specific control channel for the user equipment in a second cell.

A cell-specific identity of the first cell is the same as a cell-specific identity of the second cell, and the first cell-specific control channel is the same as the second cell-specific control channel.

With reference to the fourth aspect, the user equipment further includes a receiving module configured to receive a first RRC reconfiguration instruction sent by the communications system, where the first RRC reconfiguration instruction is used to instruct the user equipment to reconfigure the first user equipment-specific control channel as the second user equipment-specific control channel.

The detecting module is configured to detect, on the first cell-specific control channel, the information about control sent by the communications system.

A cell-specific identity of the first cell is different from a cell-specific identity of the second cell, and the first cell-specific control channel is different from the second cell-specific control channel.

The receiving module is further configured to receive a second RRC reconfiguration instruction sent by the communications system, where the second RRC reconfiguration instruction is used to instruct the user equipment to reconfigure the first cell-specific control channel as the second cell-specific control channel.

The detecting module is configured to detect, on the first user equipment-specific control channel, the information about control sent by the communications system.

According to a fifth aspect, the present disclosure provides a base station, including a processor configured to configure at least two control channels for a user equipment, where at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels; a transmitter configured to use the cell-specific control channel and/or the user equipment-specific control channel to send information about control over the user equipment.

The processor is configured to configure at least one first user equipment-specific control channel and at least one first cell-specific control channel for the user equipment in a first cell, and configure at least one second user equipment-specific control channel and at least one second cell-specific control channel for the user equipment in a second cell.

In the processor, a cell-specific identity of the first cell is the same as a cell-specific identity of the second cell, and the first cell-specific control channel is the same as the second cell-specific control channel.

The transmitter is further configured to send a first RRC reconfiguration instruction to the user equipment, where the first RRC reconfiguration instruction is used to instruct the user equipment to reconfigure the first user equipment-specific control channel as the second user equipment-specific control channel, and use the first cell-specific control channel to send the information about control.

In the processor, a cell-specific identity of the first cell is different from a cell-specific identity of the second cell, and the first cell-specific control channel is different from the second cell-specific control channel.

The transmitter is further configured to send a second RRC reconfiguration instruction to the user equipment, where the second RRC reconfiguration instruction is used to instruct the user equipment to reconfigure the first cell-specific control channel as the second cell-specific control channel, and use the first user equipment-specific control channel to send the information about control.

According to a sixth aspect, the present disclosure provides a user equipment, including a detector configured to detect, on a cell-specific control channel and/or a user equipment-specific control channel assigned by a communications system, information about control of the communications system over the user equipment, where the communications system configures at least two control channels for the user equipment, at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels.

With reference to the sixth aspect, the user equipment further includes a processor configured to use a cell-specific scrambling code to perform descrambling on the information about control.

In the processor, generation parameters of the cell-specific scrambling code include a cell-specific identity.

The processor is further configured to use a user equipment-specific scrambling code to perform descrambling on the information about control.

In the processor, generation parameters of the user equipment-specific scrambling code include a user equipment-specific identity.

Configuration parameters of the cell-specific control channel include the cell-specific identity.

Configuration parameters of the user equipment-specific control channel include the user equipment-specific identity.

The communications system configures at least one first user equipment-specific control channel and at least one first cell-specific control channel for the user equipment in a first cell; and the communications system configures at least one second user equipment-specific control channel and at least one second cell-specific control channel for the user equipment in a second cell.

A cell-specific identity of the first cell is the same as a cell-specific identity of the second cell, and the first cell-specific control channel is the same as the second cell-specific control channel.

With reference to the sixth aspect, the user equipment further includes a receiver configured to receive a first RRC reconfiguration instruction sent by the communications system, where the first RRC reconfiguration instruction is used to instruct the user equipment to reconfigure the first user equipment-specific control channel as the second user equipment-specific control channel.

The detector is configured to detect, on the first cell-specific control channel, the information about control sent by the communications system.

A cell-specific identity of the first cell is different from a cell-specific identity of the second cell, and the first cell-specific control channel is different from the second cell-specific control channel.

The receiver is further configured to receive a second RRC reconfiguration instruction sent by the communications system, where the second RRC reconfiguration instruction is used to instruct the user equipment to reconfigure the first cell-specific control channel as the second cell-specific control channel.

The detector is configured to detect, on the first user equipment-specific control channel, the information about control sent by the communications system.

In a control channel transmission method and a piece of equipment provided in the embodiments of the present disclosure, a communications system configures at least two control channels for a UE. The communications system may use, in a process of reconfiguring a control channel, another control channel to send information about control over the UE to ensure that communication is not interrupted during cell handover of the UE.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show some embodiments of the present disclosure, and a person of ordinary skill in the art may further derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
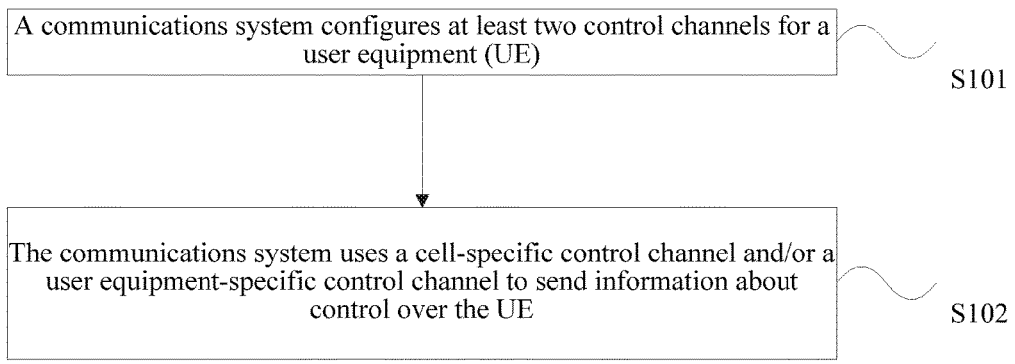
FIG. 1 is a schematic flowchart of a control channel transmission method according to the present disclosure.

FIG. 1 is a schematic flowchart of a control channel transmission method according to the present disclosure. As shown in FIG. 1, the method includes the following steps:

S101. A communications system configures at least two control channels for a user equipment, where at least one of the control channels is a cell-specific control channel, and the cell-specific control channel is shared among UEs served by a cell. That is, different UEs served by the cell correspond to a same cell-specific control channel. At least one of the control channels is a UE-specific control channel and different UEs served by a cell correspond to a same or different user equipment-specific control channels. In a specific configuration process, a base station (eNodeB) may use a control channel to send related configuration information to a UE and the UE completes configuration after receiving the configuration information.

The communications system related to this embodiment of the present disclosure may be various types of network side equipment, such as base stations on various types of communications networks, but is not limited thereto.

In a specific implementation process, in one aspect, the communications system may configure at least two control channels for the user equipment, including at least one cell-specific control channel. That is, different user equipment served by a same cell may share a cell-specific control channel of the cell. For example, the communications system may configure, in a first cell, a first cell-specific control channel for all user equipment served by the cell, and may configure, in a second cell, a second cell-specific control channel for all user equipment served by the cell.

In another aspect, the communications system may further configure a same or different user equipment-specific control channels for each user of different users of each cell. For example, the communications system may configure a first user equipment-specific control channel for a user 1 of a first cell and may configure a second user equipment-specific control channel for a user 2 of the first cell, where the first user equipment-specific control channel is the same as or different from the second user equipment-specific control channel.

It should be noted that, the cell-specific control channels and UE-specific control channels related to this embodiment of the present disclosure may be ePDCCHs or may also be PDCCHs, or may further be a combination of ePDCCHs and PDCCHs. A cell-specific control channel may be acquired according to cell-specific identity information, such as a cell identifier (ID), and a user equipment-specific control channel may be acquired according to user-specific identity information, such as a user ID, which is, nevertheless, not limited thereto.

S102. The communications system uses the cell-specific control channel and/or the user equipment-specific control channel to send information about control over the UE.

The communications system may use either the cell-specific control channel or user equipment-specific control channel to perform normal service data transmission to the user equipment, and may use another one to send various types of information about control to the UE, where the information about control may be, for example, information about control over the UE in a cell handover process, or information about control for a process in which the UE reconfigures a cell-specific control channel of a cell as that of another cell.

In one implementation scenario, when a cell-specific control channel of a UE needs to be reconfigured, for example, in a process in which the UE hands over from a first cell to a second cell, the cell-specific control channel of the first cell needs to be reconfigured as the cell-specific control channel of the second cell. In this implementation scenario, because the communications system further configures a user equipment-specific control channel for the UE, when the cell-specific control channel needs to be reconfigured, the communications system may send information about control to the UE on the user equipment-specific control channel configured for the UE, so that the UE may use a blind detection manner to detect, on the user equipment-specific control channel, the information about control sent by the communications system to ensure that communication is not interrupted.

In another implementation scenario, when a user equipment-specific control channel of a UE needs to be reconfigured, for example, in a process in which the UE hands over from a first cell to a second cell, the user equipment-specific control channel of the first cell needs to be reconfigured as the user equipment-specific control channel of the second cell. In this implementation scenario, because the communications system further configures a cell-specific control channel for the UE, when the user equipment-specific control channel needs to be reconfigured, the communications system may send information about control to the UE on the cell-specific control channel configured for the UE, so that the UE may use a blind detection manner to detect, on the cell-specific control channel, the information about control sent by the communications system to ensure that communication is not interrupted.

In a scenario in which the communications system uses the cell-specific control channel to send the information about control over the UE, the communications system may use a cell-specific scrambling code to perform scrambling on the information about control and then use the cell-specific control channel or UE-specific control channel to send scrambled information about control. Optionally, generation parameters of the cell-specific scrambling code may include a cell-specific identity and configuration parameters of the cell-specific control channel may include a cell-specific identity, which means that a cell-specific control channel and/or a cell-specific scrambling code is controlled by a cell-specific identity.

For example, a generation sequence of a scrambling code sequence of a cell-specific control channel is: $C_{init}=\lfloor n_s/2 \rfloor 2^9+N_{ID}^{Cell}$, where $n_s$ is a system timeslot number and $N_{ID}^{Cell}$ is a cell identity number, that is, a cell-specific identity.

In a scenario in which the communications system uses the user equipment-specific control channel to send the information about control over the UE, the communications system may use a UE-specific scrambling code to perform scrambling on the information about control and then use the cell-specific control channel or UE-specific control channel to send scrambled information about control. Optionally, generation parameters of the UE-specific scrambling code may include a user equipment-specific identity and configuration parameters of the UE-specific control channel may include the user equipment-specific identity, which means that a UE-specific control channel and/or a UE-specific scrambling code is controlled by a UE-specific identity. It should be noted that, a UE-specific control channel is not configured according to a UE-specific identity every time, but a UE-specific scrambling code is controlled by a UE-specific identity. That is, a user equipment-specific scrambling code for performing scrambling and descrambling on information about control of each UE is not shared among the users served by a cell, but is configured separately for each UE.

For example, a generation sequence of a scrambling code sequence of a UE-specific control channel is: $C_{init}=\lfloor n_s/2 \rfloor 2^9+N_{ID}^{UE\text{-}specific\text{-}cellID}$, where $n_s$ is a system timeslot number and $N_{ID}^{UE\text{-}specific\text{-}cellID}$ is a UE-specific identity number, that is, a UE-specific identity.

In this embodiment, a communications system configures at least two control channels for a UE. The communications system may use, in a process of reconfiguring a control channel, another control channel to send information about control over the UE to ensure that communication is not interrupted during cell handover of the UE.

Figure 2:
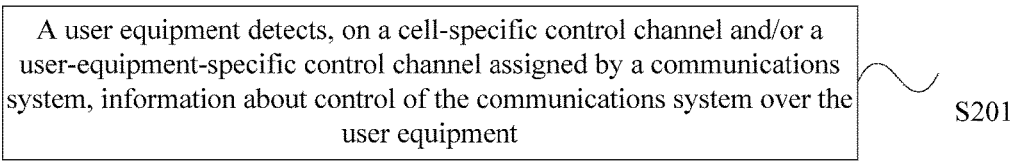
FIG. 2 is a schematic flowchart of another control channel transmission method according to the present disclosure.

FIG. 2 is a schematic flowchart of another control channel transmission method according to the present disclosure. As shown in FIG. 2, the method includes the following steps:

S201. A user equipment detects, on a cell-specific control channel and/or a user equipment-specific control channel assigned by a communications system, information about control of the communications system over the user equipment. It should be noted that, more information about control over the UE is sent on a UE-specific control channel. Therefore, when assigning the number of blind detection times, the UE may assign more blind detection times to the UE-specific control channel. Generally, a cell-specific control channel is used for transition. For example, in this embodiment, a cell-specific control channel is mainly used to send information about control over the UE when a UE-specific control channel is reconfigured, and is sometimes used to send a paging message, a system information block (SIB), and the like.

The communications system configures at least two control channels for the UE. At least one of the control channels is a cell-specific control channel. The cell-specific control channel, that is, the control channel is shared among UEs served by a cell. A same cell-specific control channel is configured for different user equipment served by the cell. At least one of the control channels is the UE-specific control channel. The UE-specific control channel, that is, user equipment-specific control channels are configured for different user equipment served by the cell. It should be noted that, the cell-specific channels and UE-specific channels related to this embodiment of the present disclosure may be ePDCCHs, may also be PDCCHs, and may further be a combination of ePDCCHs and PDCCHs. A cell-specific control channel may be acquired according to cell-specific identity information, such as a cell ID, and a user equipment-specific control channel may be acquired according to user-specific identity information, such as a user ID, which is, nevertheless, not limited thereto.

In a specific implementation process, in a scenario in which a UE detects, on a cell-specific control channel, information about control of the user equipment, the UE uses a cell-specific scrambling code to perform descrambling on the information about control. Optionally, generation parameters of the cell-specific scrambling code may include a cell-specific identity and configuration parameters of the cell-specific control channel may include the cell-specific identity.

In a scenario in which a UE detects, on a user equipment-specific control channel, information about control of the user equipment, the UE uses a user equipment-specific scrambling code to perform descrambling on the information about control. Optionally, generation parameters of the UE-specific scrambling code may include a user equipment-specific identity and configuration parameters of the UE-specific control channel may include the user equipment-specific identity.

In this embodiment, at least two control channels are configured for a UE, and a communications system may use, in a process of reconfiguring a control channel, another control channel to send information about control over the UE, so that the UE may use a blind detection manner to detect, on either of the control channels, the information about control sent by the user equipment, to ensure that communication is not interrupted during cell handover of the UE.

Figure 3:
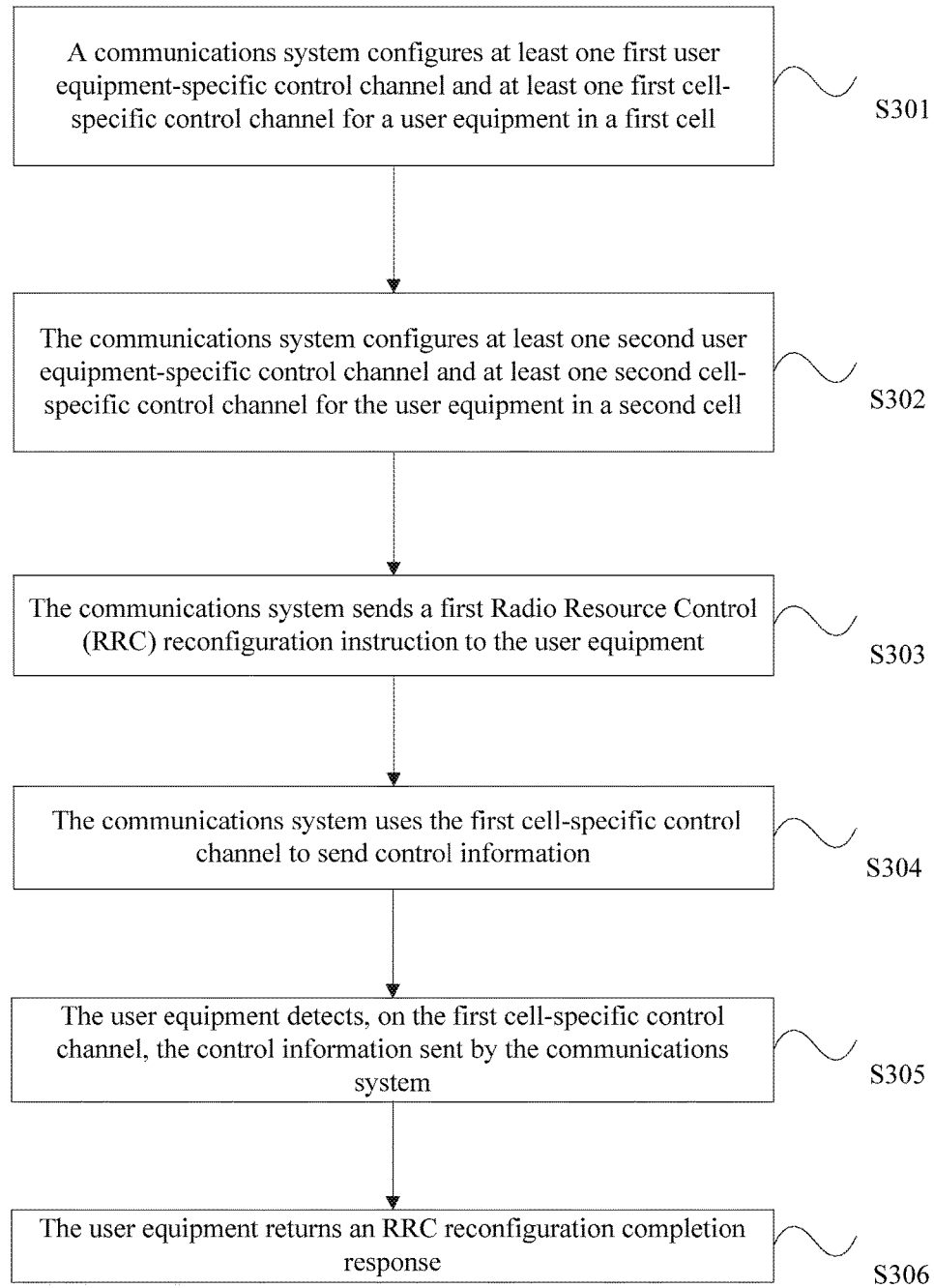
FIG. 3 is a schematic flowchart of a first embodiment of another control channel transmission method according to the present disclosure.

FIG. 3 is a schematic flowchart of a first embodiment of another control channel transmission method according to the present disclosure. As shown in FIG. 3, this embodiment provides a method, using which a communications system may, in a specific implementation scenario in which the communications system sends information about control to a UE, use a cell-specific control channel to send the information about control over the UE when a user equipment-specific control channel needs to be reconfigured during a cell handover of the UE, where the method includes the following steps:

S301. The communications system configures at least one first user equipment-specific control channel and at least one first cell-specific control channel for the user equipment in a first cell.

S302. The communications system configures at least one second user equipment-specific control channel and at least one second cell-specific control channel for the user equipment in a second cell.

A cell-specific identity of the first cell may be the same as a cell-specific identity of the second cell, and meanwhile, the first cell-specific control channel is the same as the second cell-specific control channel. That is, the first cell and second cell share a cell-specific control channel.

S303. The communications system sends a first RRC reconfiguration instruction to the user equipment, where the first RRC reconfiguration instruction is used to instruct the user equipment to reconfigure the first user equipment-specific control channel as the second user equipment-specific control channel.

S304. The communications system uses the first cell-specific control channel to send the information about control.

S305. The user equipment detects, on the first cell-specific control channel, the information about control sent by the communications system.

S306. The user equipment returns an RRC reconfiguration completion response.

After receiving the RRC reconfiguration completion response returned by the user equipment, the communications system may send, on the second user specific equipment control channel, the information about control.

Figure 4:
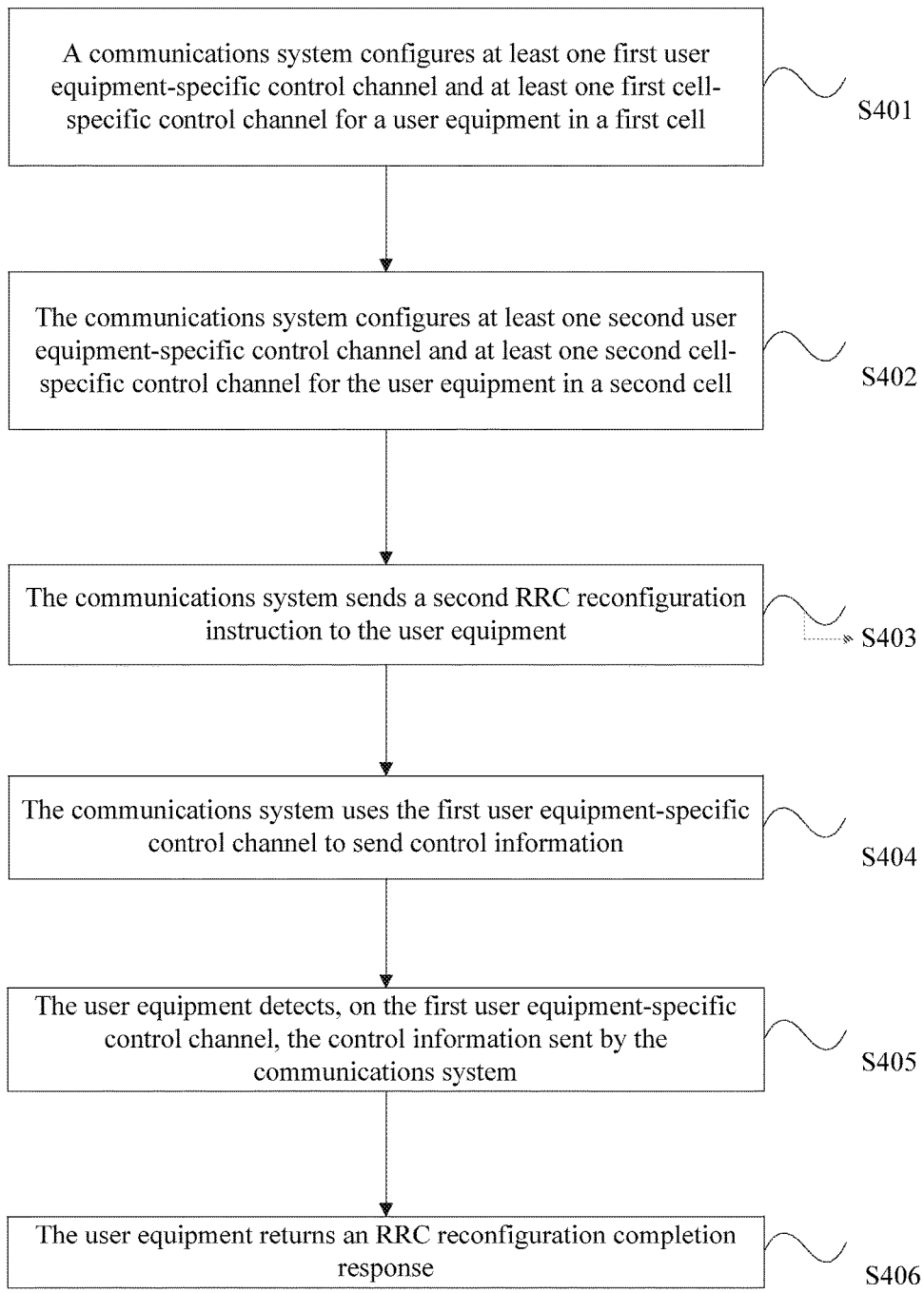
FIG. 4 is a schematic flowchart of a second embodiment of another control channel transmission method according to the present disclosure.

FIG. 4 is a schematic flowchart of a second embodiment of another control channel transmission method according to the present disclosure. As shown in FIG. 4, this embodiment of the present disclosure provides a method, using which a communications system may, in another specific implementation scenario in which the communications system sends information about control to a UE, use a user equipment-specific control channel to send the information about control over the UE when a cell-specific control channel needs to be reconfigured during a cell handover of the UE, where the method includes the following steps:

S401. The communications system configures at least one first user equipment-specific control channel and at least one first cell-specific control channel for the user equipment in a first cell.

S402. The communications system configures at least one second user equipment-specific control channel and at least one second cell-specific control channel for the user equipment in a second cell.

A first cell-specific identity is different from a cell-specific identity of the second cell, and meanwhile, the first cell-specific control channel is different from the second cell-specific control channel.

S403. The communications system sends a second RRC reconfiguration instruction to the user equipment, where the second RRC reconfiguration instruction is used to instruct the user equipment to configure the first cell-specific control channel as the second cell-specific control channel.

S404. The communications system uses the first user equipment-specific control channel to send the information about control.

S405. The user equipment detects, on the first user equipment-specific control channel, the information about control sent by the communications system.

S406. The user equipment returns an RRC reconfiguration completion response.

After receiving the RRC reconfiguration completion response returned by the user equipment, the communications system may send, on the second cell-specific control channel, the information about control, and may then perform reconfiguration of the first user equipment-specific control channel.

In this embodiment, because at least two control channels are configured for a UE, a communications system may use, in a process of reconfiguring a control channel, another control channel to send information about control over the UE, so that the UE may use a blind detection manner to detect, on either of the control channels, the information about control sent by the user equipment, to ensure that communication is not interrupted during cell handover of the UE.

Figure 5:
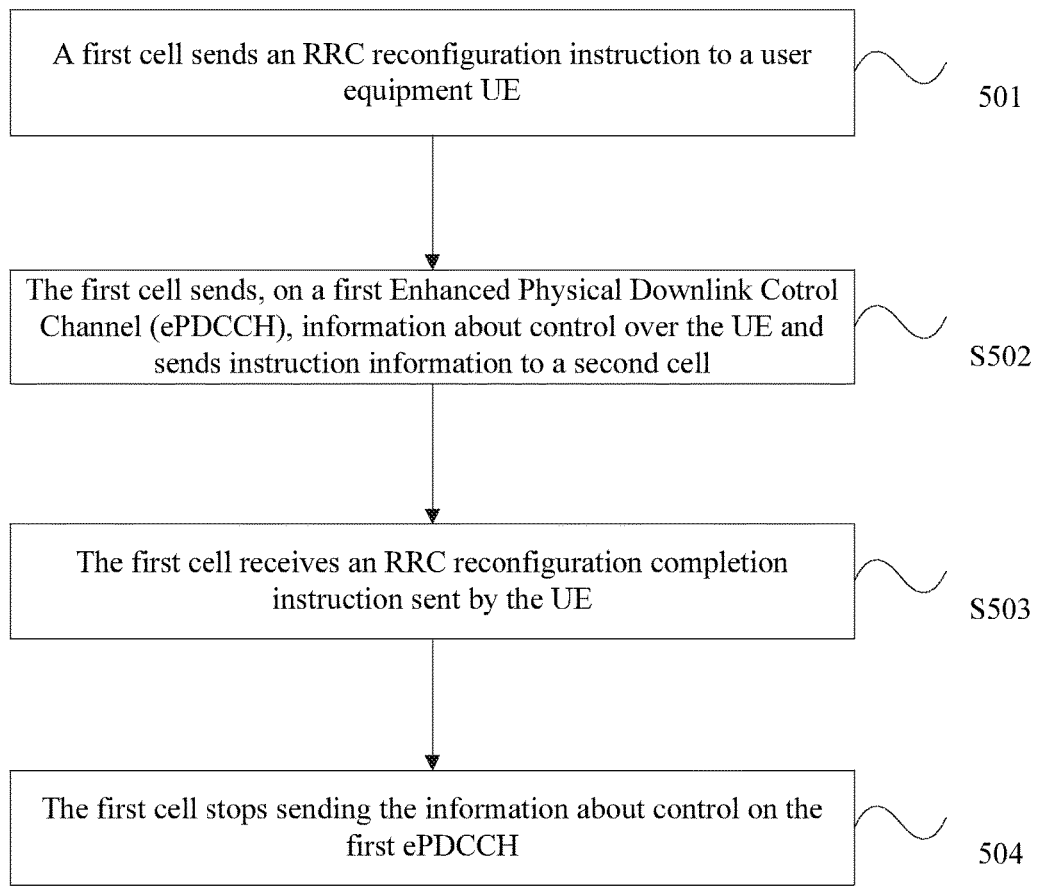
FIG. 5 is a schematic flowchart of a first embodiment of another control channel transmission method according to the present disclosure.

FIG. 5 is a schematic flowchart of a first embodiment of another control channel transmission method according to the present disclosure. As shown in FIG. 5, this embodiment provides a method, using which a communications system simultaneously sends, when a UE hands over between a first cell and a second cell, information about control over the UE on control channels used by the first cell and second cell, where the method includes the following steps:

S501. The first cell sends an RRC reconfiguration instruction to the user equipment UE, where the RRC instruction is used to instruct the UE to reconfigure a first ePDCCH used for communication with the first cell as a second ePDCCH used for communication with the second cell.

S502. The first cell sends, on the first ePDCCH, the information about control over the UE and sends instruction information to the second cell, where the instruction information is used to instruct the second cell to send, on the second ePDCCH, the information about control. That is, the information about control may be sent simultaneously on the first ePDCCH and second ePDCCH, to ensure that the UE may perform blind detection to detect the information about control in a process of reconfiguring the control channels.

S503. The first cell receives an RRC reconfiguration completion instruction sent by the UE, where the reconfiguration completion instruction is used to indicate that the UE completes reconfiguring the first ePDCCH used for communication with the first cell as the ePDCCH used for communication with the second cell.

S504. The first cell stops sending the information about control on the first ePDCCH. That is, only the second cell sends the information about control on the second ePDCCH.

In this embodiment, a first cell and a second cell separately use a control channel used by the first cell and a control channel used by the second cell to simultaneously send information about control over a UE, to ensure that the UE may detect, in a process of handover between the first cell and second cell, the information about control, which ensures that communication is not interrupted.

Figure 6:
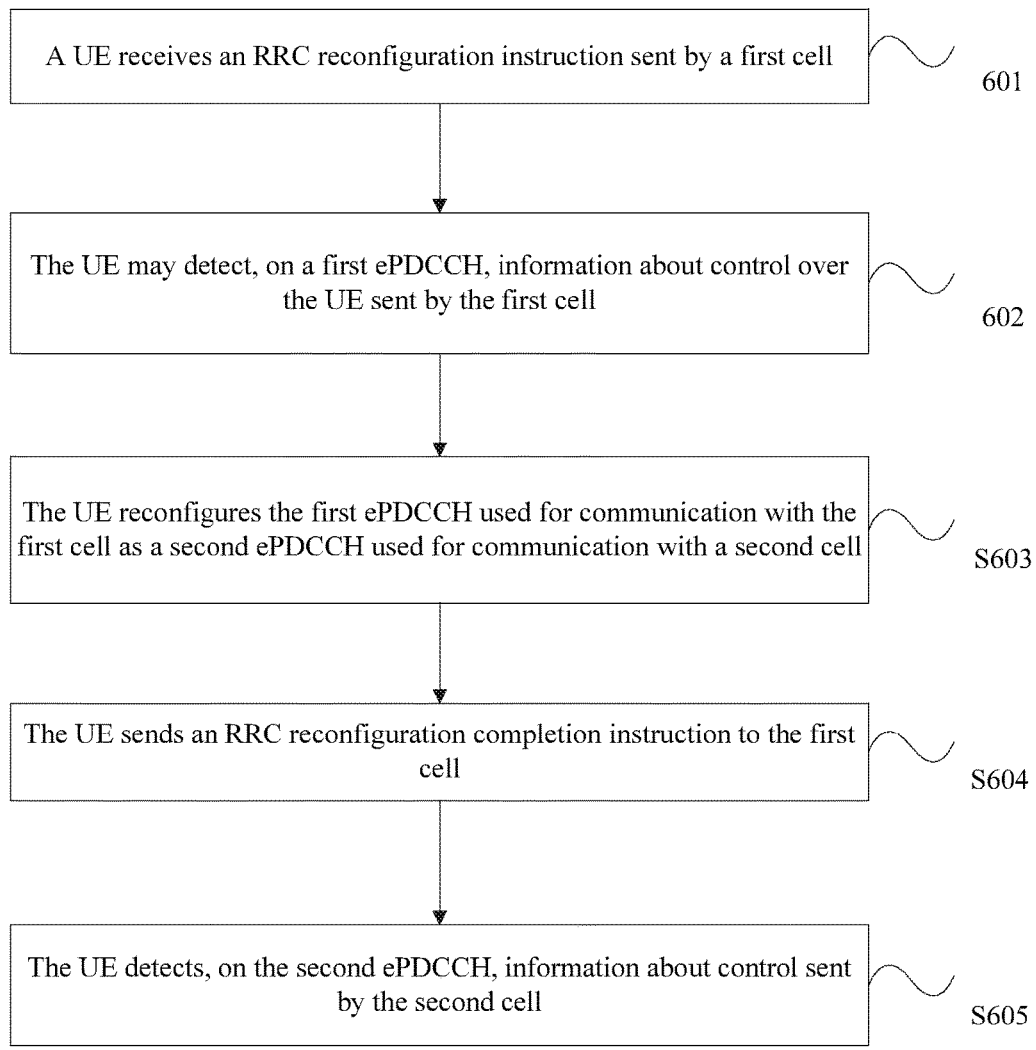
FIG. 6 is a schematic flowchart of a first embodiment of another control channel transmission method according to the present disclosure.

FIG. 6 is a schematic flowchart of a first embodiment of another control channel transmission method provided in the present disclosure. As shown in FIG. 6, the method includes the following steps:

S601. A UE receives a RRC reconfiguration instruction sent by a first cell, where the RRC instruction is used to instruct the UE to reconfigure a first ePDCCH used for communication with the first cell as a second ePDCCH used for communication with a second cell.

When handing over from the first cell to the second cell, the UE needs to reconfigure control channels. In this case, the first cell uses the first ePDCCH to send information about control over the UE, and meanwhile instructs the second cell to use the second ePDCCH to send the information about control to the UE.

S602. The UE may detect, on the first ePDCCH, the information about control over the UE sent by the first cell, and may also detect, on the second ePDCCH, the information about control sent by the second cell.

S603. The UE reconfigures the first ePDCCH used for communication with the first cell as the second ePDCCH used for communication with the second cell.

S604. The UE sends an RRC reconfiguration completion instruction to the first cell, where the reconfiguration completion instruction is used to indicate that the UE completes reconfiguring the first ePDCCH used for communication with the first cell as the ePDCCH used for communication with the second cell.

S605. The UE detects, on the second ePDCCH, the information about control sent by the second cell.

In this embodiment, a first cell and a second cell separately use a control channel used by the first cell and a control channel used by the second cell to simultaneously send information about control over a UE, to ensure that the UE may detect, in a process of handover between the first cell and second cell, the information about control regardless of on the first ePDCCH or second ePDCCH, which ensures that communication is not interrupted.

Figure 7:
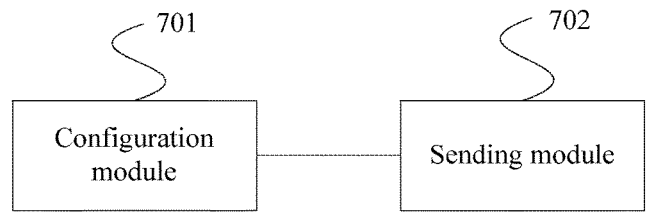
FIG. 7 is a schematic structural diagram of a first embodiment of a communications system according to the present disclosure.

FIG. 7 is a schematic structural diagram of a first embodiment of a communications system according to the present disclosure. The communications system includes a communications network side equipment. Further, as shown in FIG. 7, the communications network side equipment includes a configuration module 701 and a sending module 702.

The configuration module 701 is configured to configure at least two control channels for a user equipment, where at least one of the control channels is a cell-specific control channel, the cell-specific control channel is shared among user equipment served by a cell, different user equipment served by the cell correspond to a same cell-specific control channel, at least one of the control channels is a user equipment-specific control channel, and different user equipment served by the cell correspond to a same or different user equipment-specific control channels.

The sending module 702 is configured to use the cell-specific control channel and/or the user equipment-specific control channel to send information about control over the user equipment.

For operations of the modules, refer to the foregoing method embodiments. Repeated description is not provided herein.

Figure 8:
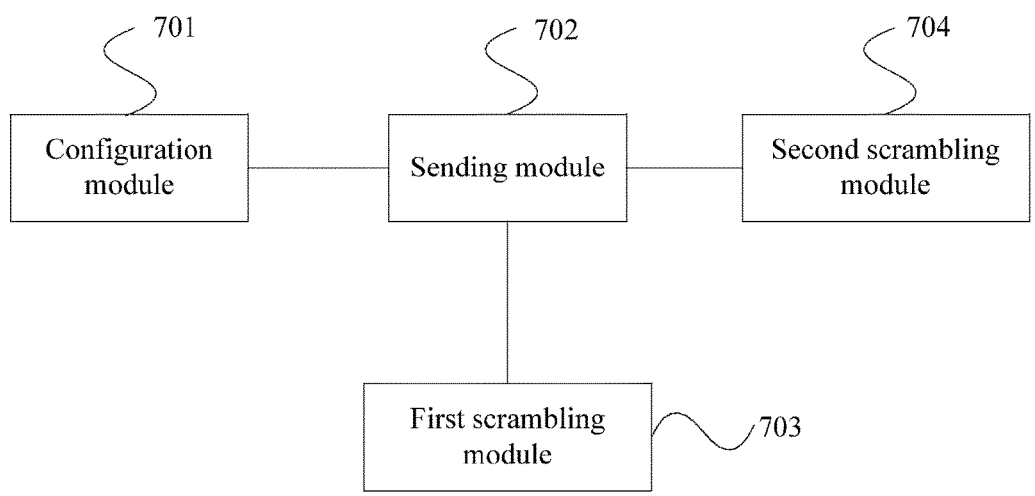
FIG. 8 is a schematic structural diagram of a second embodiment of a communications system according to the present disclosure.

FIG. 8 is a schematic structural diagram of a second embodiment of a communications system according to the present disclosure. As shown in FIG. 8 and based on FIG. 7, the communications network side equipment further includes a first scrambling module 703 and a second scrambling module 704.

The first scrambling module 703 is configured to use a cell-specific scrambling code to perform scrambling on the information about control.

Here, the sending module 702 is configured to use the cell-specific control channel or the user equipment-specific control channel to send scrambled information about control.

It should be noted that, in the first scrambling module 703, generation parameters of the cell-specific scrambling code may include a cell-specific identity.

The second scrambling module 704 is configured to use a user equipment-specific scrambling code to perform scrambling on the information about control.

Here, the sending module 702 is configured to use the user equipment-specific control channel or the cell-specific control channel to send scrambled information about control.

It should be noted that, in the second scrambling module 704, generation parameters of the user equipment-specific scrambling code include a user equipment-specific identity.

Furthermore, the configuration module 701 is configured to include the cell-specific identity in configuration parameters of the cell-specific control channel, and is configured to include the user equipment-specific identity information in configuration parameters of the user equipment-specific control channel.

In a specific implementation process, the configuration module 701 is configured to configure at least one first user equipment-specific control channel and at least one first cell-specific control channel for the user equipment in a first cell, and configure at least one second user equipment-specific control channel and at least one second cell-specific control channel for the user equipment in a second cell.

Further, there are two situations. In a first situation, in the configuration module 701, a cell-specific identity of the first cell is the same as a cell-specific identity of the second cell and the first cell-specific control channel is the same as the second cell-specific control channel. Therefore, the second module 702 sends a first RRC reconfiguration instruction to the user equipment, where the first RRC reconfiguration instruction is used to instruct the user equipment to reconfigure the first user equipment-specific control channel as the second user equipment-specific control channel, and uses the first cell-specific control channel to send the information about control.

In a second situation, in the configuration module 701, a cell-specific identity of the first cell is different from a cell-specific identity of the second cell and the first cell-specific control channel is different from the second cell-specific control channel. Therefore, the second module 702 sends a second RRC reconfiguration instruction to the user equipment, where the second RRC reconfiguration instruction is used to instruct the user equipment to reconfigure the first cell-specific control channel as the second cell-specific control channel, and uses the first user equipment-specific control channel to send the information about control.

For operations of the modules, refer to the foregoing method embodiments. Repeated description is not provided herein.

In this embodiment, a configuration module of a communications network side equipment configures at least two control channels for a UE. A sending module of the communications network side equipment may use, in a process of reconfiguring a control channel, another control channel to send information about control over the UE, to ensure that communication is not interrupted during cell handover of the UE.

Figure 9:
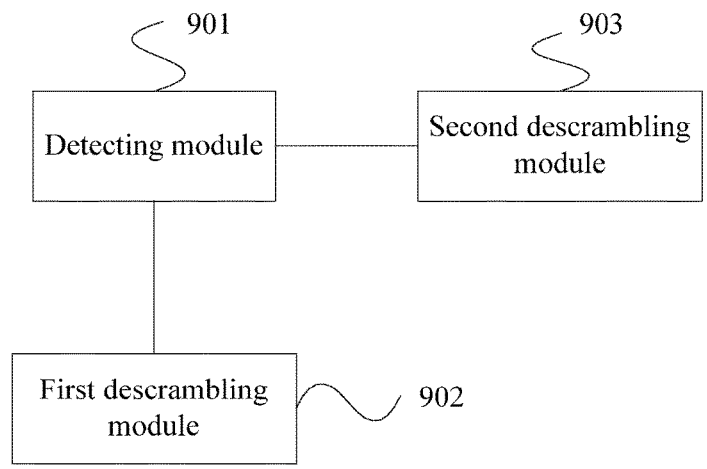
FIG. 9 is a schematic structural diagram of a first embodiment of a user equipment according to the present disclosure.

FIG. 9 is a schematic structural diagram of a first embodiment of a user equipment according to the present disclosure. As shown in FIG. 9, the user equipment includes a detecting module 901, and based on which further includes a first descrambling module 902 and a second descrambling module 903.

The detecting module 901 is configured to detect, on a cell-specific control channel and/or a user equipment-specific control channel assigned by a communications system, information about control of the communications system over the user equipment, where the communications system configures at least two control channels for the user equipment, where, at least one of the control channels is a cell-specific control channel, the cell-specific control channel is shared among user equipment served by a cell, different user equipment served by the cell correspond to a same cell-specific control channel, at least one of the control channels is a user equipment-specific control channel, and different user equipment served by the cell correspond to a same or different user equipment-specific control channels.

The first descrambling module 902 is configured to use a cell-specific scrambling code to perform descrambling on the information about control, where in the first descrambling module 902, generation parameters of a cell-specific scrambling code includes a cell-specific identity.

The second descrambling module 903 is configured to use a user equipment-specific scrambling code to perform descrambling on the information about control, where in the second descrambling module 903, generation parameters of a user equipment-specific scrambling code includes a user equipment-specific identity.

Furthermore, configuration parameters of the cell-specific control channel include the cell-specific identity and configuration parameters of the user equipment-specific control channel include the user equipment-specific identity.

In a specific implementation process, the communications system shown in FIG. 7 and FIG. 8 configures at least one first user equipment-specific control channel and at least one first cell-specific control channel for the user equipment in a first cell, and configures at least one second user equipment-specific control channel and at least one second cell-specific control channel for the user equipment in a second cell.

For operations of the modules, refer to the foregoing method embodiments. Repeated description is not provided herein.

Figure 10:
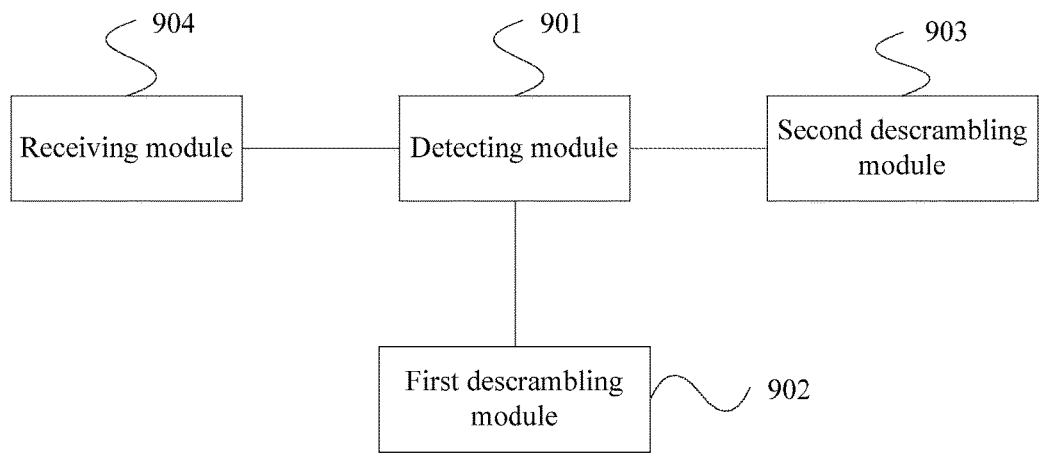
FIG. 10 is a schematic structural diagram of a second embodiment of a user equipment according to the present disclosure.

FIG. 10 is a schematic structural diagram of a second embodiment of a user equipment according to the present disclosure. As shown in FIG. 10 and based on FIG. 9, the user equipment further includes a receiving module 904.

Further, there are two situations. In a first situation, a cell-specific identity of a first cell is the same as a cell-specific identity of a second cell and a first cell-specific control channel is the same as a second cell-specific control channel. Then, the receiving module 904 is configured to receive a first RRC reconfiguration instruction sent by a communications system, where the first RRC reconfiguration instruction is used to instruct the user equipment to reconfigure a first user equipment-specific control channel as a second user equipment-specific control channel. The detecting module 901 is configured to detect, on the first cell-specific control channel, information about control sent by the communications system.

In a second situation, a cell-specific identity of a first cell is different from a cell-specific identity of a second cell and a first cell-specific control channel is different from a second cell-specific control channel. Then, the receiving module

904 is configured to receive a second RRC reconfiguration instruction sent by a communications system, where the second RRC reconfiguration instruction is used to instruct the user equipment to reconfigure a first cell-specific control channel as a second cell-specific control channel. The detecting module 901 is configured to detect, on the first user equipment-specific control channel, information about control sent by the communications system.

For operations of the modules, refer to the foregoing method embodiments. Repeated description is not provided herein.

In this embodiment, a communications system configures at least two control channels for a UE. The communications system may use, in a process of reconfiguring a control channel, another control channel to send information about control over the UE to ensure that the detecting module of the UE can use blind detection to detect information about control, which ensures that communication is not interrupted during cell handover of the UE.

Figure 11:
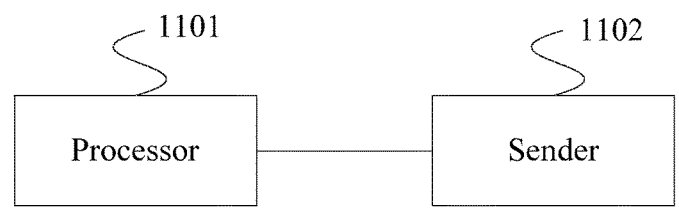
FIG. 11 is a schematic structural diagram of a first embodiment of a base station according to the present disclosure.

FIG. 11 is a schematic structural diagram of a first embodiment of a base station according to the present disclosure. As shown in FIG. 11, the base station includes a processor 1101 and a transmitter 1102.

The processor 1101 is configured to configure at least two control channels for a user equipment, where at least one of the control channels is a cell-specific control channel, different user equipment served by a cell correspond to a same cell-specific control channel, at least one of the control channels is a user equipment-specific control channel, and different user equipment served by a cell correspond to a same or different user equipment-specific control channels.

The transmitter 1102 is configured to use the cell-specific control channel and/or the user equipment-specific control channel to send information about control over the user equipment.

In a specific implementation process, the processor 1101 is further configured to use a cell-specific scrambling code to perform scrambling on the information about control. It should be noted that, generation parameters of the cell-specific scrambling code include a cell-specific identity.

The transmitter module 1102 is configured to use the cell-specific control channel or the user equipment-specific control channel to send scrambled information about control.

The processor 1101 is configured to use a user equipment-specific scrambling code to perform scrambling on the information about control. Generation parameters of the user equipment-specific scrambling code include a user equipment-specific identity.

The transmitter 1102 is configured to use the user equipment-specific control channel or the cell-specific control channel to send scrambled information about control.

Furthermore, the processor 1101 is configured to include the cell-specific identity in configuration parameters of the cell-specific control channel and include the user equipment-specific identity in configuration parameters of the user equipment-specific control channel.

In an implementation process, the processor 1101 is configured to configure at least one first user equipment-specific control channel and at least one first cell-specific control channel for the user equipment in a first cell, and configure at least one second user equipment-specific control channel and at least one second cell-specific control channel for the user equipment in a second cell.

Further, there are two situations. In a first situation, in the processor 1101, a cell-specific identity of the first cell is the same as a cell-specific identity of the second cell and the first cell-specific control channel is the same as the second cell-specific control channel. In this situation, the transmitter 1102 is further configured to send a first RRC reconfiguration instruction to the user equipment, where the first RRC reconfiguration instruction is used to instruct the user equipment to reconfigure the first user equipment-specific control channel as the second user equipment-specific control channel, and use the first cell-specific control channel to send the information about control.

In a second situation, in the processor 1101, a cell-specific identity of the first cell is different from a cell-specific identity of the second cell and the first cell-specific control channel is different from the second cell-specific control channel. In this situation, the transmitter 1102 is further configured to send a second RRC reconfiguration instruction to the user equipment, where the second RRC reconfiguration instruction is used to instruct the user equipment to reconfigure the first cell-specific control channel as the second cell-specific control channel, and use the first user equipment-specific control channel to send the information about control.

For operations of the processor and transmitter, refer to the foregoing method embodiments. Repeated description is not provided herein.

In this embodiment, a processor of a base station configures at least two control channels for a UE. A transmitter of the base station may use, in a process of reconfiguring a control channel, another control channel to send information about control over the UE, to ensure that communication is not interrupted during cell handover of the UE.

Figure 12:
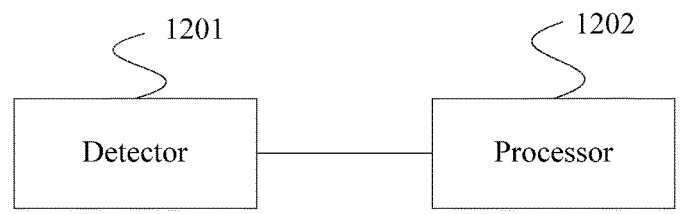
FIG. 12 is a schematic structural diagram of a first embodiment of another user equipment according to the present disclosure.

FIG. 12 is a schematic structural diagram of a first embodiment of another user equipment according to the present disclosure. As shown in FIG. 12, the user equipment includes a detector 1201, and based on which further includes a processor 1202.

The detector 1201 is configured to detect, on a cell-specific control channel and/or a user equipment-specific control channel assigned by a communications system, information about control of the communications system over the user equipment, where the communications system configures at least two control channels for the user equipment, where at least one of the control channels is a cell-specific control channel, different user equipment served by a cell correspond to a same cell-specific control channel, at least one of the control channels is a user equipment-specific control channel, and different user equipment served by the cell correspond to a same or different user equipment-specific control channels.

Configuration parameters of the cell-specific control channel include a cell-specific identity and configuration parameters of the user equipment-specific control channel include a user equipment-specific identity.

The processor 1202 is configured to use a cell-specific scrambling code to perform descrambling on the information about control. Generation parameters of the cell-specific scrambling code include a cell-specific identity.

The processor 1202 is further configured to use a user equipment-specific scrambling code to perform descrambling on the information about control. Generation parameters of a user equipment-specific scrambling code include a user equipment-specific identity.

It should be noted that, a communications system configures at least one first user equipment-specific control channel and at least one first cell-specific control channel for the user equipment in a first cell.

The communications system configures at least one second user equipment-specific control channel and at least one second cell-specific control channel for the user equipment in a second cell.

For operations of the detector and processor, refer to the foregoing method embodiments. Repeated description is not provided herein.

Figure 13:
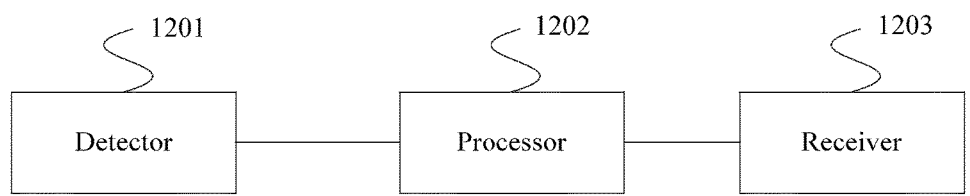
FIG. 13 is a schematic structural diagram of a second embodiment of another user equipment according to the present disclosure.

FIG. 13 is a schematic structural diagram of a second embodiment of another user equipment according to the present disclosure. As shown in FIG. 13 and based on FIG. 12, the user equipment further includes a receiver 1203.

Further, there are two situations. In a first situation, a cell-specific identity of a first cell is the same as a cell-specific identity of a second cell and a first cell-specific control channel is the same as a second cell-specific control channel. In this situation, the receiver 1203 is configured to receive a first RRC reconfiguration instruction sent by a communications system, where the first RRC reconfiguration instruction is used to instruct the user equipment to reconfigure a first user equipment-specific control channel as a second user equipment-specific control channel. The detector 1201 is configured to detect, on the first cell-specific control channel, information about control sent by the communications system.

In a second situation, a cell-specific identity of a first cell is different from a cell-specific identity of a second cell and a first cell-specific control channel is different from a second cell-specific control channel. In this situation, the receiver 1203 is further configured to receive a second RRC reconfiguration instruction sent by a communications system, where the second RRC reconfiguration instruction is used to instruct the user equipment to reconfigure a first cell-specific control channel as a second cell-specific control channel. The detector 1201 is configured to detect, on the first user equipment-specific control channel, information about control sent by the communications system.

For operations of the receiver, refer to the foregoing method embodiments. Repeated description is not provided herein.

In this embodiment, a communications system configures at least two control channels for a UE. The communications system may use, in a process of reconfiguring a control channel, another control channel to send information about control over the UE, to ensure that a detector of the UE can use blind detection to detect information about control, which ensures that communication is not interrupted during cell handover of the UE.

Persons of ordinary skill in the art may understand that all or part of the steps of the method embodiments may be implemented by a program instructing related hardware. The program may be stored in a computer readable storage medium. When the program runs, the steps of the method embodiments are performed. The foregoing storage medium includes any medium that can store program code, such as a ROM (read-only memory), a RAM (random access memory), a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A control channel transmission method implemented by a communications network side device, comprising:
configuring a first user equipment-specific control channel and a first cell-specific control channel for a user equipment in a first cell;
configuring a second user equipment-specific control channel and a second cell-specific control channel for the user equipment in a second cell, a first cell-specific identity being different from a second cell-specific identity, and the first cell-specific control channel being different from the second cell-specific control channel;
sending a radio resource control (RRC) reconfiguration instruction to the user equipment when the user equipment hands over from the first cell to the second cell, the RRC reconfiguration instruction being used to instruct the user equipment to configure the first cell-specific control channel as the second cell-specific control channel; and
sending first information about control using the first user equipment-specific control channel to the user equipment, which comprises:
scrambling the first information about control using a user equipment-specific scrambling code, a generation sequence of the user equipment-specific scrambling code being $C_{init}=\lfloor n_s/2 \rfloor 2^9+N_{ID}^{UE\text{-}specific\text{-}cellID}$, $n_s$ being a system timeslot number, and $N_{ID}^{UE\text{-}specific\text{-}cellID}$ being a user equipment-specific identity; and
sending the scrambled first information about control to the user equipment using the first user equipment-specific control channel.

2. The method according to claim 1, further comprising:
receiving an RRC reconfiguration completion response from the user equipment; and
sending second information about control using the second cell-specific control channel.

3. The method according to claim 1, wherein the first user equipment-specific control channel, the first cell-specific control channel, the second user equipment-specific control channel, and the second cell-specific control channel are enhanced physical downlink control channels (ePDCCHs).

4. A base station comprising:
a processor; and
a memory coupled to the processor and storing instructions, wherein the instructions are executable by the processor and cause the base station to:
configure a first user equipment-specific control channel and a first cell-specific control channel for a user equipment in a first cell;
configure a second user equipment-specific control channel and a second cell-specific control channel for the user equipment in a second cell, a first cell-specific identity being different from a second cell-specific identity, and the first cell-specific control channel being different from the second cell-specific control channel;
send a radio resource control (RRC) reconfiguration instruction to the user equipment when the user equipment hands over from the first cell to the second cell, the RRC reconfiguration instruction being used to instruct the user equipment to configure the first cell-specific control channel as the second cell-specific control channel; and
send first information about control using the first user equipment-specific control channel to the user equipment, which comprises:

scrambling the first information about control by a user equipment-specific scrambling code, a generation sequence of the user equipment-specific scrambling code being $C_{init} = \lfloor n_s/2 \rfloor 2^9 + N_{ID}^{UE\text{-}specific\text{-}cellID}$, $n_s$ being a system timeslot number, and $N_{ID}^{UE\text{-}specific\text{-}cellID}$ bring a user equipment-specific identity; and sending the scrambled first information about control to the user equipment using the first user equipment-specific control channel.

5. The base station according to claim 4, wherein the instructions further cause the base station to:

receive an RRC reconfiguration completion response from the user equipment; and send second information about control using the second cell-specific control channel.

6. The base station according to claim 4, wherein the first user equipment-specific control channel, the first cell-specific control channel, the second user equipment-specific control channel, and the second cell-specific control channel are enhanced physical downlink control channels (ePDCCHs).

* * * * *